United States Patent [19]

Maruyama

[11] Patent Number: 4,652,051
[45] Date of Patent: Mar. 24, 1987

[54] FOLDING SEAT

[75] Inventor: Hidekazu Maruyama, Kanagawa, Japan

[73] Assignee: Ikeda Bussan Co., Ltd., Ayase, Japan

[21] Appl. No.: 849,402

[22] Filed: Apr. 8, 1986

[30] Foreign Application Priority Data

Apr. 8, 1985 [JP] Japan .................. 60-51784

[51] Int. Cl.⁴ ............................................. B60N 1/02
[52] U.S. Cl. .................................... 297/332; 297/333
[58] Field of Search ............... 297/332, 333, 331, 335, 297/336

[56] References Cited

U.S. PATENT DOCUMENTS

| | | | |
|---|---|---|---|
| 776,044 | 11/1904 | Blanchard | 297/333 |
| 1,106,693 | 8/1914 | von Wranau | 297/332 |
| 1,213,920 | 1/1917 | Szymkowiak | 297/332 |
| 2,278,749 | 4/1942 | Todd | 297/232 X |
| 3,594,037 | 7/1971 | Sherman | 297/332 |

Primary Examiner—Francis K. Zugel
Attorney, Agent, or Firm—Schwartz, Jeffery, Schwaab, Mack, Blumenthal & Evans

[57] ABSTRACT

A folding seat is disclosed which comprises a base structure, a seat cushion pivotally mounted to the base structure, a seat back pivotally connected to the seat cushion, first springs arranged between the seat cushion and the seat back to bias them toward each other, a second spring arranged between the seat cushion and the base structure, and a guide mechanism for causing the seat back to pivot to its upright in-use position when the seat cushion is pivoted to its horizontal in-use position. The second spring is so arranged that once the seat cushion is pivoted to a certain angular position, further pivoting of the same toward a desired position is automatically carried out thereafter.

9 Claims, 15 Drawing Figures

FIG.4
FIG.5
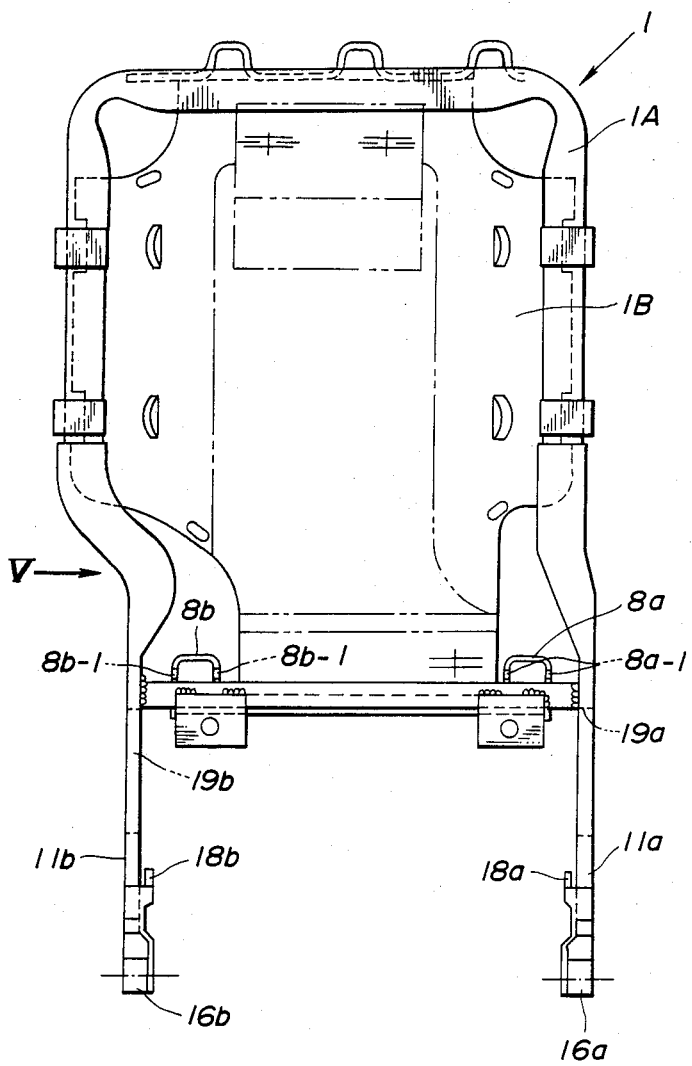
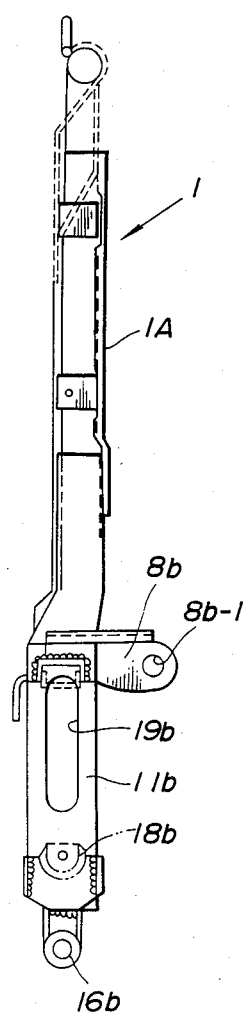

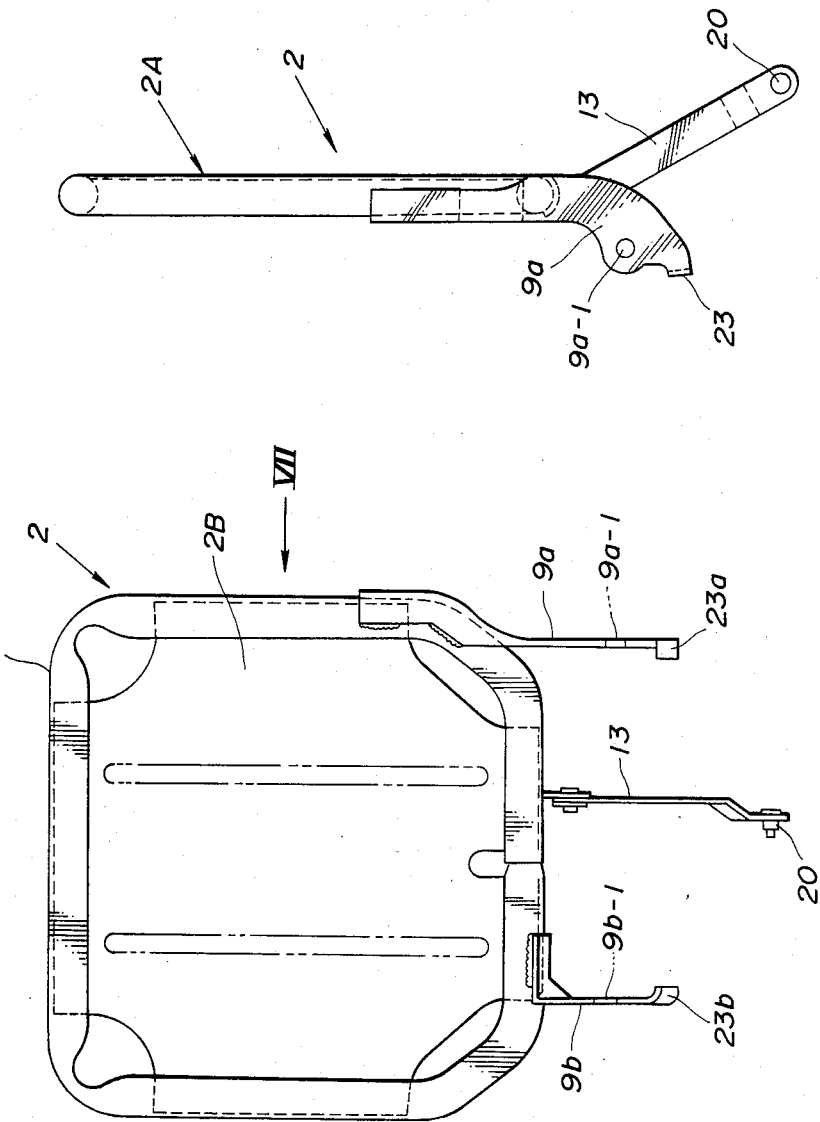

FIG.12(a)
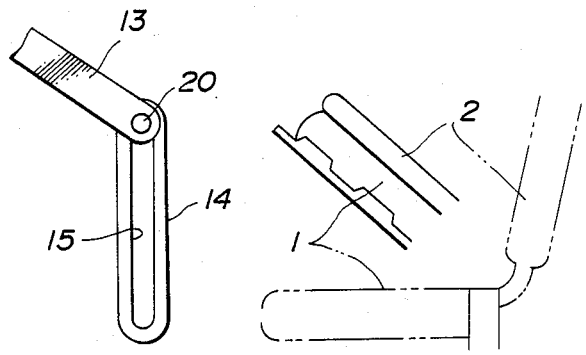
FIG.12(b)    FIG.12(c)
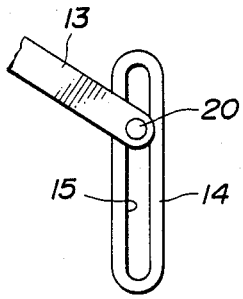   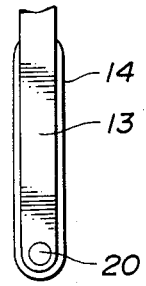
FIG.13
(Prior Art)
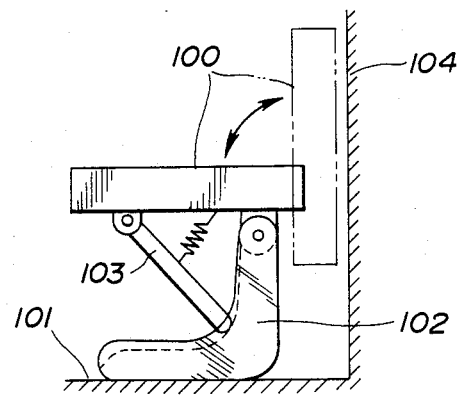

FOLDING SEAT

BACKGROUND OF THE INVENTION

1. Field of the Invention

The present invention relates in general to a folding seat for a motor vehicle, which is foldable when not in use, and more particularly to a folding seat which is installed in a driver's cabin of a truck or the like for use as an extra seat.

2. Description of a Prior Art

One of the conventional seats of a type as mentioned hereinabove is shown in FIG. 13, which is commonly called "jump seat" the seat cushion of which is foldable when not in use. The seat has a seat cushion 100 which is pivotally mounted on a base structure 102 secured to a floor 101 of the driver's cabin near a rear or side wall 104 of the same. The seat cushion 100 has a supporting stay 103 pivotally hanging down therefrom. A spring (no numeral) biases the stay 103 toward the seat cushion 100. When not in use, the seat cushion 100 assumes an upright folded position as illustrated by a phantom line. Upon requirement of use, the seat cushion 100 is pulled down from the folded position and the stay 103 is pulled against the spring bringing the lower free end thereof into locking engagement with a suitable portion of the base structure 102 so as to hold the seat cushion 100 in a horizontal in-use position as illustrated by a solid line. The wall 104 located behind the seat can serve as a backrest.

However, as is understood to those skilled in the art, the handling of the seat is not easy because of the troublesome steps required for assembling and/or folding the seat. In fact, the troublesome work may cause the operator to get hurt in the finger.

SUMMARY OF THE INVENTION

It is therefore an essential object of the present invention to provide a folding seat which is easy in handling.

According to the present invention, there is provided a folding seat in which once a seat cushion is pivoted to a predetemined angular position against a biasing spring, further pivoting movement of the seat cushion in the same direction (that is, toward a folded position or an in-use position of the seat cushion) is automatically carried out due to a snap action function of the biasing spring.

According to the present invention, there is provided a folding seat which comprises a base structure, a seat cushion pivotally mounted at a first given portion thereof to the base structure, so that the seat cushion is pivotal between an in-use position and a folded position, a seat back pivotally connected to a second given portion of the seat cushion, the seat back being capable of assuming an upright in-use position and an upright folded position, first biasing means arranged between the seat cushion and the seat back to bias these two members toward each other, second biasing means arranged between the seat cushion and the base structure to bias the seat cushion toward the in-use position when the seat cushion is in a first angular range including the in-use position, and bias the seat cushion toward the folded position when the seat cushion is in a second angular range including the folded position, and first guide means arranged between the seat back and the base structure to pivot the seat back to the upright in-use position when the seat cushion is pivoted to the in-use position.

BRIEF DESCRIPTION OF THE DRAWINGS

Other objects and advantages of the present invention will become apparent from the following description when taken in conjunction with the accompanying drawings, in which:

FIG. 4 is a back view of a seat cushion frame;

FIG. 5 is a side view of the seat cushion frame, taken from the direction of the arrow V of FIG. 4;

FIG. 6 is a back view of a seat back frame;

FIG. 7 is a side view of the seat back frame, taken from the direction of the arrow VII of FIG. 6;

FIGS. 12(a), 12(b) and 12(c) are partial views of a guide mechanism of the folding seat of the invention, showing various conditions of the mechanism, which are taken when the seat cushion is being folded; and FIG. 13 is a side view of the conventional folding seat which has been described hereinabove.

DESCRIPTION OF THE INVENTION

In the following, the folding seat of the present invention will be described with reference to the drawings. In the description, the terms "front", "rear", "upper" and "lower" are used with respect to a condition wherein the seat is in use, that is, the seat cushion is in its horizontal position and the seat back is in its upright position.

Figure 1:
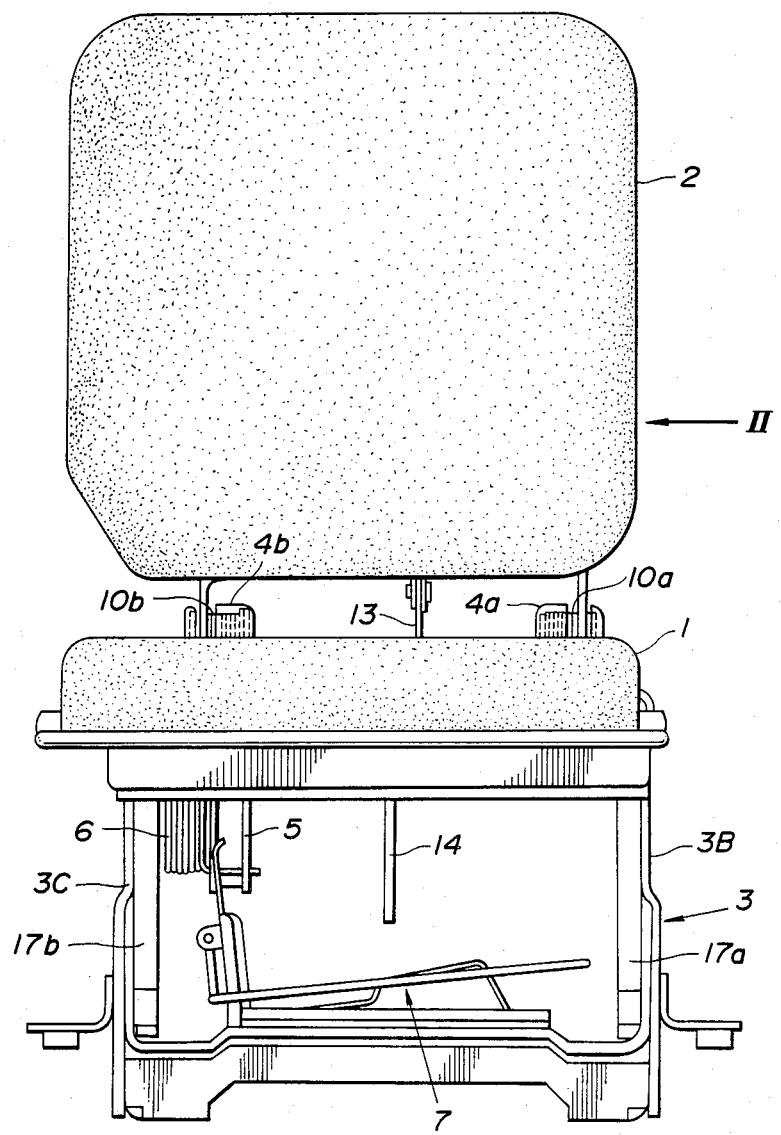
FIG. 1 is a front view of a folding seat of the present invention.

In FIG. 1, numeral 1 denotes a seat cushion to which a seat back 2 is pivotally connected. The seat cushion 1 is pivotally mounted to a base structure 3 which is adapted to be mounted on a floor of a driver's cabin of a motor vehicle. Preferably, the base structure 3 is mounted on a recessed portion of the floor near a rear or side wall of the driver's cabin. A pair of spiral springs 4a and 4b are disposed between the seat cushion 1 and the seat back 2 to bias these two members toward each other. A spiral spring 6 is arranged between the seat cushion 1 and the base structure 3 in order that under a given condition, the seat cushion 1 is biased toward its horizontal in-use position and under another given condition, the seat cushion is biased toward its upright folded position. For this, an end of the spring 6 is pivotally connected to a rearward extension of the seat cushion 1 and the other end of the same is pivotally connected to a bracket 5 secured to a back wall 3A of the base structure 3, as will be clarified hereinafter. Denoted by numeral 7 is a holding member used for stationarily holding a tool (viz., jack) put in the base structure 3.

The pivotal connection between the seat cushion 1 and the seat back 2 will be described in detail hereinbelow. As is seen from FIGS. 4 and 5, a generally rectangular frame 1A of the seat cushion 1 is equipped at the rear portion thereof with two spaced channel-like brackets 8a and 8b each having aligned openings 8a1 and 8b-1, and as is seen from FIGS. 6 and 7, a generally rectangular frame 2A of the seat back 2 is provided at the lower portion thereof with spaced arms 9a and 9b each having an opening 9a-1 or 9b-1. Suitable metal sheets 1B and 2B extend across the frames 1A and 2A. Although not shown in the drawings, suitable cushion pads are mounted on them.

Figure 2:
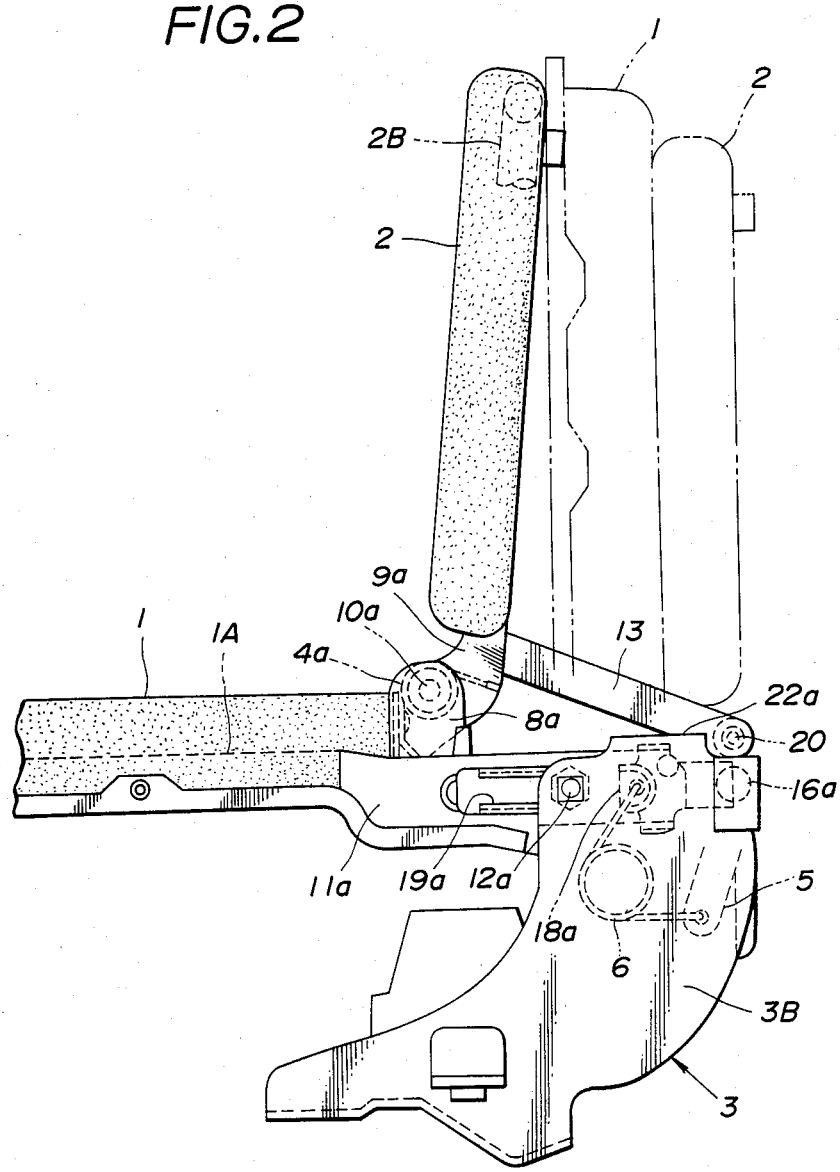
FIG. 2 is a side view of the folding seat, taken from the direction of the arrow II of FIG. 1.

As is understood from FIG. 2, the brackets 8a and 8b of the seat cushion 1 and the arms 9a and 9b of the seat back 2 are pivotally connected throught respective pivot pins 10a and 10b (see FIG. 1) each passing through the aligned openings (8a-1,9a-1) or (8b-1, 9b-1) of the mated bracket and arm (8a,9a) or (8b,9b). Each of the spiral springs 4a and 4b is disposed about the corresponding pivot pin 10a or 10b with one end hooked to the bracket 8a or 8b and the other end hooked to the arm 9a or 9b. With this arrangement, the seat cushion 1 and the seat back 2 are biased to pivot about the pivot pins 10a and 10b toward each other.

Figure 3:
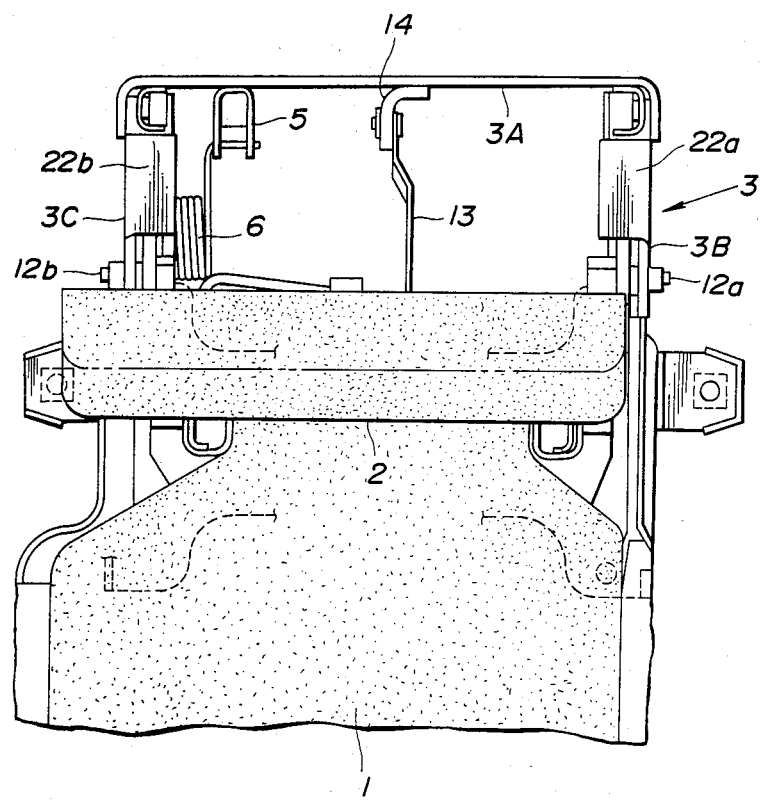
FIG. 3 is a plan view of the folding seat.

As is seen from FIGS. 4 and 5, the side portions of the seat cushion frame 1A extend rearward beyond the rear portion of the same to form rearwardly extending arms (rearward arms) 11a and 11b which are pivotally connected to side walls 3B and 3C of the base structure 3. That is, as will be clarified as the description proceeds, the seat cushion 1 together with the seat back 2 can pivot about aligned pivot shafts 12a and 12b (see FIG. 3) which are secured to the side walls 3B and 3C of the base structure 3. As is seen from FIGS. 4 and 5, each rearward arm 11a or 11b is formed at its generally middle portion with an engaging portion 18a or 18b. An end of the spring 6 is connected to the engaging portion 18b. That is, as is seen from FIG. 2, upon assembly, the spring 6 is arranged with one end pivotally connected to the engaging portion 18a of the rearward arm 11a and the other end pivotally connected to the channel-like bracket 5 secured to the rear wall 3A (see FIG. 3) of the base structure 3.

Figure 8:
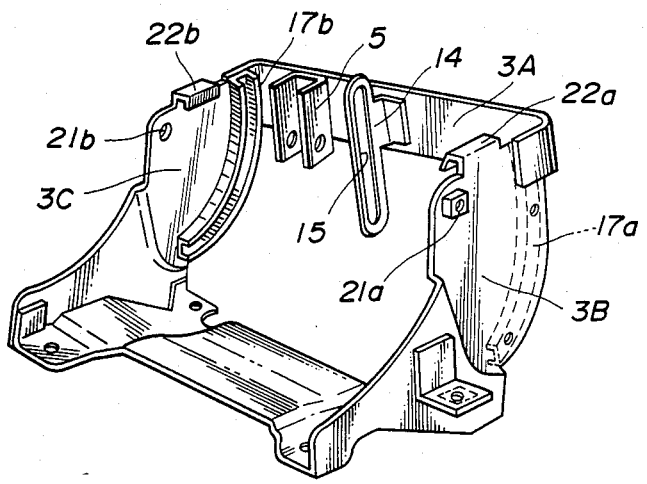
FIG. 8 is a perspective view of a base structure.
Figure 9:
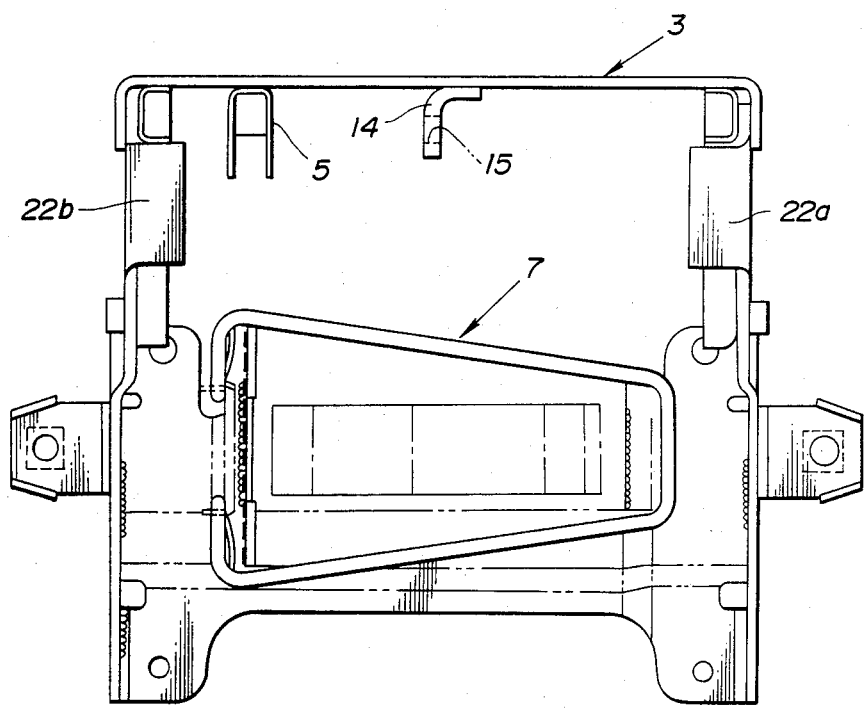
FIG. 9 is a plan view of the base structure.
Figure 10:
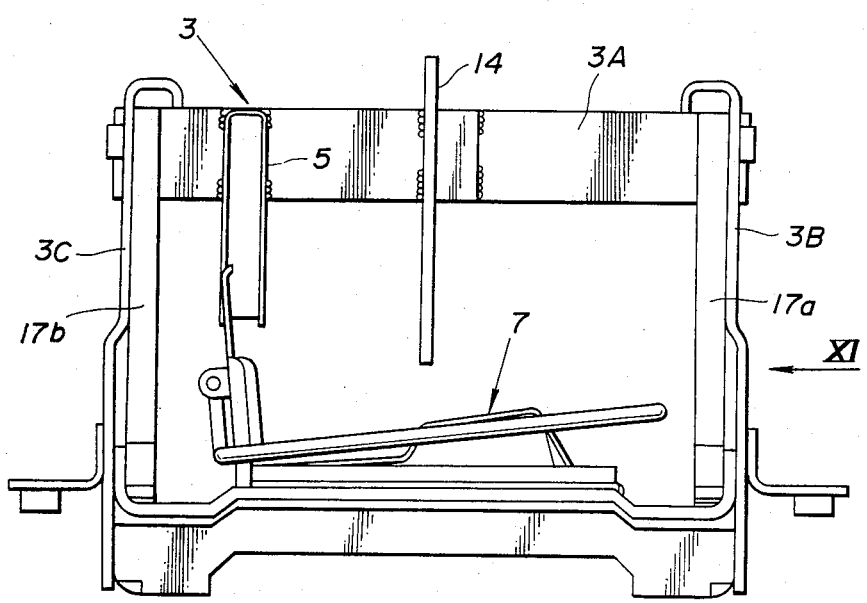
FIG. 10 is a front view of the base structure.
Figure 11:
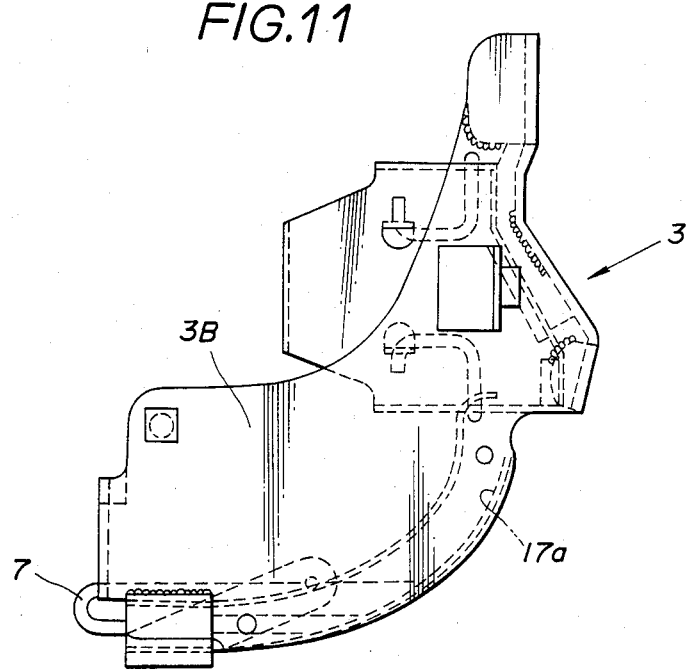
FIG. 11 is a side view of the base structure, taken from the direction of the arrow XI of FIG. 10.

As is seen from FIGS. 4 and 5, each of the rearward arms 11a and 11b is formed with an elongate slot 19a or 19b through which the afore-mentioned pivot shaft 12a or 12b (see FIG. 2) passes. The leading end of each rearward arm 11a or 11b is provided with a roller 16a or 16b. As is best seen from FIG. 8, a pair of channel-like curved guide rails 17a and 17b are secured to the inside surfaces of the side walls 3B and 3C, into which the rollers 16a and 16b on the rearward arms 11a and 11b of the seat cushion 1 are rotatably received to run therealong. Denoted by numerals 21a and 21b in FIG. 8 are openings of the side walls 3B and 3C, into which the afore-mentioned pivot shafts 12a and 12b are securedly received. It is to be noted that the distance between each guide rail 17a or 17b and the corresponding opening 21a or 21b is increased gradually with increase of distance from the top of the guide rail. Thus, during pivotal movement of the seat cushion 1, the rollers 16a and 16b run in and along the guide rails 17a and 17b allowing the pivot shafts 12a and 12b to slide in and along the corresponding elongate slots 19a and 19b of the rearward arms 11a and 11b. Denoted by numerals 22a and 22b (see FIG. 8) are stoppers formed on the base structure 3, against which the rearward arms 11a and 11b abut to suppress extreme pivoting movement of the seat cushion 1 in the counterclockwise direction in FIG. 2.

Operation of the folding seat of the invention will be described with reference to FIGS. 1 and 2. For ease with which the description is made, it will be commenced with respect to a condition wherein, as is shown in the drawings, the seat assumes its in-use condition, that is, the seat cushion 1 is held in the horizontal position and the seat back 2 is held in the upright position. Under this condition, the seat cushion 1 assumes its forwardmost position having the rear ends of the elongate slots 19a and 19b of the rearward arms 11a and 11b in contact with the associated pivot shafts 12a and 12b, and the rearward arms 11a and 11b are in contact with stoppers 22a and 22b (see FIG. 2) formed on the base structure 3. Furthermore, under this condition, the roller 20 on the link 13 assumes its uppermost position in the elongate slot 15 of the guide member 14, as is seen from FIG. 12(a), and the lower ends 23a and 23b (see FIG. 7) of the arms 9a and 9b of the seat back frame 2B (see FIGS. 6 and 7) abut on the back frame portion of the seat cushion 1, as will be seen from FIG. 2, thereby to suppress further pivotal movement of the seatback 2 in the clockwise direction in the FIG. 2.

When, upon requirement of seat folding, the seat cushion 1 is pulled upward, the seat cushion 1 is pivoted upward about the pivot shafts 12a and 12b against the force of the spring 6. This pivoting movement against the spring 6 continues until the seat cushion 1 comes to a certain angular position (viz., the position at about 45 degrees from the horizontal in-use position) wherein both ends of the spring 6 assume their mutually closest positions to generate maximum biasing force thereof. During this pivoting movement of the seat cushion 1, the roller 20 on the link 13 of the seat back 2 remains in the uppermost position (see FIG. 12(a)) of the guide member 14 thereby causing the seat back 2 to tilt forward about the pivot pins 10a and 10b. Just when the seat cushion 1 inclines beyond the certain angular position, the positional relation between the spring 6 and the rearward arm 11a of the seat cushion 1 is so changed that the force generated by the spring 6 biases the seat cushion 1 upward, that is, in a clockwise direction in FIG. 2. Thus, once the seat cushion 1 is raised up to the certain angular position, the seat cushion 1 is thereafter automatically raised or jumped to the upright folded position together with the seat back 2. During this automatic movement, the roller 20 moves from the uppermost position (see FIG. 12(a)) to the lowermost position (see FIG. 12(c)) in the elongate slot 15 of the guide member 14. Because of the non-concentric form of the guide rails 17a and 17b and the provision of the elongate slots 19a and 19b of the rearward arms 11a and 11b of the seat cushion 1, when brought into the upright folded positions, the folded seat cushion 1 and the seat back 2 fall into the base structure 3 lowering the heights thereof, as will be seen from their folded positions illustrated by phantom lines in FIG. 2. This is advantageous because of compactness of the seat in the folded state.

When, upon requirement of seat setting, the seat cushion 1 is pulled forward, the same is pivoted downward against the force of the spring 6. This pivoting movement against the spring 6 continues until the seat cushion 1 comes down to the certain angular position. During this, the roller 20 on the link 13 of the seat back 2 moves from the lowermost position (see FIG. 12(c)) to the uppermost position (see FIG. 12(a)) in the slot 15 of the guide member 4 permitting the seat back 2 to follow the seat cushion 1 to the certain angular position. When the downward pivoting of the seat cushion 1 exceeds the certain angle, the spring 6 switches to bias the seat cushion 1 downward, that is, in a counterclockwise direction in FIG. 2. Thus, thereafter, the seat cushion 1 is automatically pivoted to the horizontal in-use position, causing the seat back 2 to pivot clockwise about the pivot pins 10a and 10b back to the upright in-use position because of a pulling action of the link 13 which then assumes its uppermost position (see FIG. 12(a)).

It is to be noted that during the counterclockwise pivoting for the seat setting, the seat cushion 1 is gradually moved forward relative to the base structure 3 because of the provision of the guide rails 17a and 17b and the elongate slots 19a and 19b.

As is understood from the foregoing description, in the folding seat according to the present invention, once the seat cushion is brought to a predetermined angular position, the same is thereafter automatically pivoted to a desired in-use position or a folded position thereof thereby facilitating handling of the seat.

Furthermore, when not in use, the seat cushion can be folded and fall into the base structure together with the seat back thereby achieving compactness of the seat in folded state.

What is claimed is:

1. A folding seat comprising:
    a base structure;
    a seat cushion pivotally mounted at a first given portion thereof to said base structure, so that said seat cushion is pivotal between an in-use position and a folded position;
    a seat back pivotally connected to a second given portion of said seat cushion, said seat back being capable of assuming an upright in-use position and an upright folded position;
    first biasing means arranged between said seat cushion and said seat back to bias these two members toward each other;
    second biasing means arranged between said seat cushion and said base structure to bias said seat cushion toward said in-use position when said seat cushion is in a first angular range including said in-use position, and bias said seat cushion toward said folded position when said seat cushion is in a second angular range including said folded position; and
    first guide means arranged between said seat back and said base structure to pivot said seat back to said upright in-use position when said seat cushion is pivoted to said in-use position.

2. A folding seat as claimed in claim 1, in which said first guide means comprises:
    a link pivotally connected at its one end to said seat back;
    a roller rotatably mounted to the other end of said link; and
    an elongate guide member having therein an elongate slot in which said roller is rotatably disposed, said elongate guide member being secured to said base structure.

3. A folding seat as claimed in claim 2, further comprising second guide means arranged between said seat cushion and said base structure for moving said seat cushion and said seat back to their lowermost positions relative to said base structure when they are brought into their folded positions.

4. A folding seat as claimed in claim 3, in which said seat cushion has two spaced arms which extend rearward from the seat cushion proper, said spaced arms being pivotally connected to said base structure to serve as said first given portion.

5. A folding seat as claimed in claim 4, in which said seat cushion has two spaced brackets which are formed on the rear portion of said seat cushion proper to pivotally mount thereon a lower portion of said seat back to serve as said second given portion.

6. A folding seat as claimed in claim 5, in which said first biasing means comprises a spiral spring.

7. A folding seat as claimed in claim 5, in which said second biasing means comprises a spiral spring which has an end pivotally connected to one of said spaced arms of said seat cushion and the other end pivotally connected through a bracket to said base structure.

8. A folding seat as claimed in claim 4, in which said second guide means comprises:
    means for defining an elongate slot in each of said two spaced arms of said seat cushion;
    a pivot shaft secured to said base structure and slidably put in each of said elongate slots of said two spaced arms;
    a roller rotatably connected to a leading end of each of said two spaced arms of said seat cushion; and
    a curved guide rail secured to the base structure, along which said roller of each arm of the seat cushion runs, said guide rail being so constructed and arranged that the distance between said guide rail and said pivot shaft is gradually increased with increase of distance from the top of the guide rail.

9. A folding seat as claimed in claim 8, in which said curved guide rail is of a channel member.

* * * * *